(12) United States Patent
Brenner

(10) Patent No.: US 6,563,616 B1
(45) Date of Patent: May 13, 2003

(54) OPTICAL DEMULTIPLEXER

(75) Inventor: Douglas Brenner, New York City, NY (US)

(73) Assignee: Electro-Optical Sciences, Inc., Irvington, NY (US)

( * ) Notice: Subject to any disclaimer, the term of this patent is extended or adjusted under 35 U.S.C. 154(b) by 0 days.

(21) Appl. No.: 09/253,312

(22) Filed: Feb. 21, 1999

(51) Int. Cl.$^7$ ................................................ H04J 14/02
(52) U.S. Cl. ...................... 359/127; 359/583; 359/634
(58) Field of Search .................................... 359/127, 583, 359/634; 385/24

(56) References Cited

U.S. PATENT DOCUMENTS

| | | | |
|---|---|---|---|
| 4,466,694 A | | 8/1984 | MacDonald |
| 4,474,424 A | * | 10/1984 | Wagner ...................... 359/127 |
| 4,813,756 A | | 3/1989 | Frenkel |
| 4,992,656 A | * | 2/1991 | Clauser ...................... 250/251 |
| 5,027,435 A | | 6/1991 | Chraplyvy |
| 5,040,169 A | | 8/1991 | Guerin |
| 5,343,542 A | | 8/1994 | Kash |
| 5,504,609 A | | 4/1996 | Alexander |
| 5,528,406 A | | 6/1996 | Jeffrey |
| 5,539,518 A | * | 7/1996 | Bennett ...................... 356/452 |
| 5,666,195 A | | 9/1997 | Shultz |
| 5,978,114 A | * | 11/1999 | Clark et al. ................. 359/115 |
| 5,999,320 A | * | 12/1999 | Shirasaki ..................... 359/577 |
| 6,205,270 B1 | * | 3/2001 | Cao ............................ 385/24 |
| 6,263,126 B1 | * | 7/2001 | Cao ............................ 385/24 |
| 6,297,895 B1 | * | 10/2001 | Okuno ........................ 359/124 |
| 6,396,629 B1 | * | 5/2002 | Cao ............................ 359/484 |

FOREIGN PATENT DOCUMENTS

WO     WO98/14807     4/1998

OTHER PUBLICATIONS

"Fabry–Perot Inteferometers", G. Hernandez, Cambridge Univ. Press, NY1986, pp. 53–54.
"Geometry and Physical Optics", R. S. Longhurst, John Wiley & Sons Inc., NY, 1962, pp. 178–179; 257–260.
"Applications of Bragg Grating Sensors in Europe", P. Fedinand, Int'nl. Conf. Optical Fiber Sensors, OFS'97, Oct. 28–31, 1997 Williamsburg, VA, pp. 1–6.

* cited by examiner

Primary Examiner—Leslie Pascal
Assistant Examiner—Sherif R. Fahmy
(74) Attorney, Agent, or Firm—Howard R. Popper

(57) ABSTRACT

A compact wavelength division demultiplexer device comprises two cascaded interferometers the wedge angle of whose mirrors are orthogonal to each other, i.e., the two interferometers are oriented such that the dispersion of light with wavelength from the second interferometer is orthogonal to the dispersion of light with wavelength from the first interferometer. The incoming beam of laser light carrying n sub-bands of m information channels is collimated and applied to the first interferometer whose free spectral range is determined by the total bandwidth required by the n×m channels and whose finesse is determined by the resolution needed to spatially separate each of the n sub-bands from one another. The light leaving the first interferometer enters the second interferometer whose wedge angle is at 90 degrees to the plane of the wedge angle of the first interferometer. The free spectral range of the second interferometer is determined by the number (m) of channels within a sub-band and its finesse is determined by the need to resolve the m channels from one another. The beams emerging from the second interferometer, in which the location of each fringe depends on its wavelength, are imaged upon a detector array whose elements are associated with a specific wavelength of the free spectral range of the second interferometer.

8 Claims, 3 Drawing Sheets

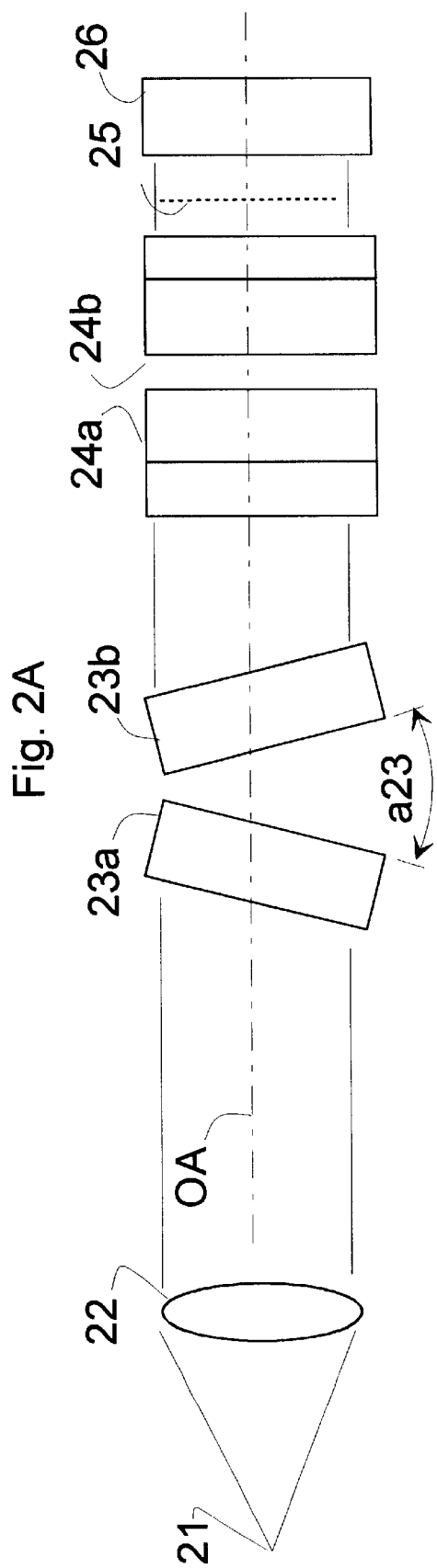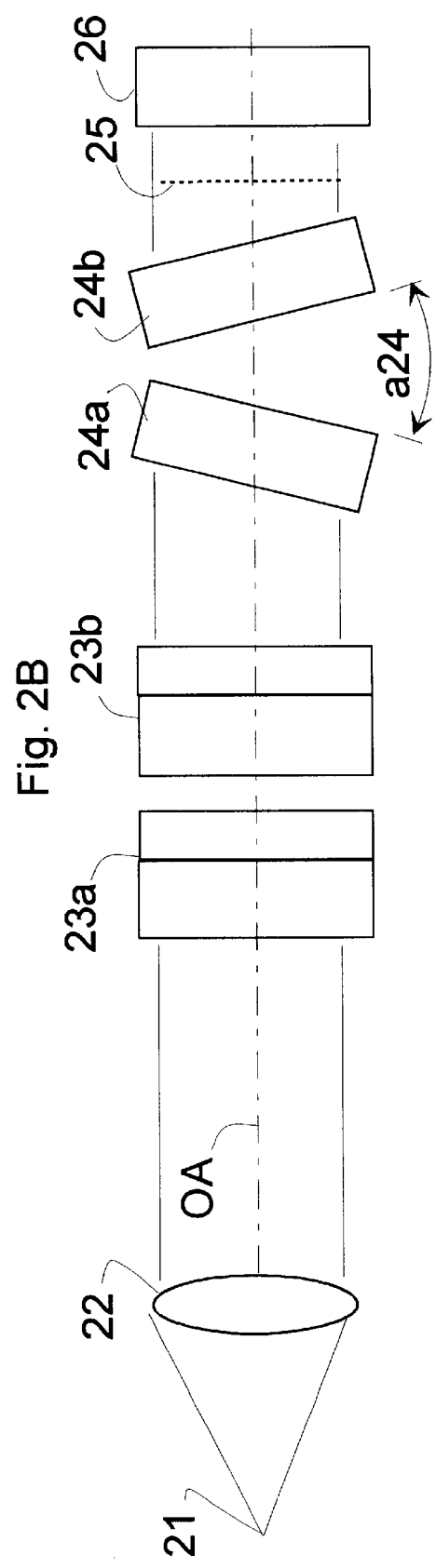

OPTICAL DEMULTIPLEXER

FIELD OF THE INVENTION

This invention relates generally to demultiplexing signals encoded in a light beam and, more particularly, to optical devices for demultiplexing different wavelengths of laser radiation.

BACKGROUND OF THE INVENTION

Lightwave communication over fiber optics is attractive because it offers tremendous bandwidth, low noise and low attenuation in transmission over considerable distances. Conventional fibers offer three low attenuation and high capacity transmission bands passbands in the near infra-red at approximately 0.85, 1.3 and 1.5 microns. Each such passband in a typical fiber is about 200 nm wide between half-power points and therefore provides 26,000 gigahertz transmission capacity, enough to accommodate hundreds if not thousands of discrete wavelengths or transmission channels. While the transmission capabilities of fiber networks are impressive, communication of information ultimately demands that a particular channel be established between a given transmitter and a given receiver, if not permanently then at appropriate times.

Heretofore the problem of associating one receiver with one transmitter has been approached mainly by using tunable transmitters, tunable receivers, or both. An alternative approach is disclosed in U.S. Pat. No. 5,040,169 to Guerin et al in which an illustrative four modulated wavelengths W1, . . . , W4 are demultiplexed in a "switching fabric" at a point 30 into two wavetrains W1, W2 and W3, W4 and then, at subsequent points 36, 38 further demultiplexed into four distinct output positions 41–44 in a horizontal plane, at each of which only one modulated wavelength appears. The same output position also appears in one of four vertical planes. While the duplication of output positions may serve a useful purpose, this redundancy incurs extra cost.

It is known that a multiple wavelength light beam may be split into physically distinct positions with a Fizeau interferometer which maps optical frequencies into a spatial distribution of fringe intensities. The fringes may be detected with photodiodes and then subjected to signal processing for estimation of the position of the Fizeau fringe as a function of signal level and fringe width. While a tunable Fabry-Perot interferometer in which mirror spacing can be varied can be used to scan a light beam in order to obtain one wavelength at a time, this may involve an intolerable delay in obtaining the desired wavelength or group of wavelengths one channel at a time.

SUMMARY OF THE INVENTION

A compact wavelength division demultiplexer device according to an illustrative embodiment of the invention comprises two orthogonally cascaded interferometers which are interposed at a point in a wideband light path at which it is desired to individually resolve (demultiplex) the multiple information signals carried by the light beam into spatially separated discrete wavelengths or channels. Thus, for a given transmission band, say one in the 1300 nm region, where there may be n sub-bands each carrying m information channels, the cascaded arrangement would resolve any of the n×m channels. The incoming beam of laser light is collimated and applied to the first interferometer. The free spectral range of the first interferometer is determined by the total bandwidth required by the n×m channels and its finesse (a measure of the interferometer's channel selectivity) is determined by the resolution needed to spatially separate each of the n sub-bands from one another. The separation is determined by the amount of crosstalk which can be tolerated between adjacent sub-bands. The light leaving the first interferometer remains collimated and enters the second interferometer which is in line with the first interferometer and whose wedge angle is at 90 degrees to the plane of the wedge angle of the first interferometer. The two interferometers are oriented such that the dispersion of light with wavelength from the second interferometer is orthogonal to the dispersion of light with wavelength from the first interferometer. The free spectral range of the second interferometer is determined by the number (m) of channels within a sub-band and its finesse is determined by the need to resolve the m channels from one another. The separation here is determined by the amount of crosstalk which can be tolerated between adjacent channels. The collimated beams emerging from the second interferometer in which the location of each fringe depends on its wavelength are imaged upon a detector array or a bundled array of individual fibers, each of which ultimately terminates in an individual detector (not shown). In either event, each detector is uniquely associated with a specific wavelength of the free spectral range of the second interferometer.

BRIEF DESCRIPTION OF THE DRAWINGS

The foregoing and other features of the invention may be better understood from a reading of the ensuing description together with the drawing, in which:

FIG. 2A is a simplified, two-dimensional side elevation view of the orthogonally cascaded interferometers of my invention;

FIG. 2B is a simplified, two-dimensional top (plan) view of the orthogonally cascaded interferometers of FIG. 2A;

GENERAL DESCRIPTION

Figure 1A:
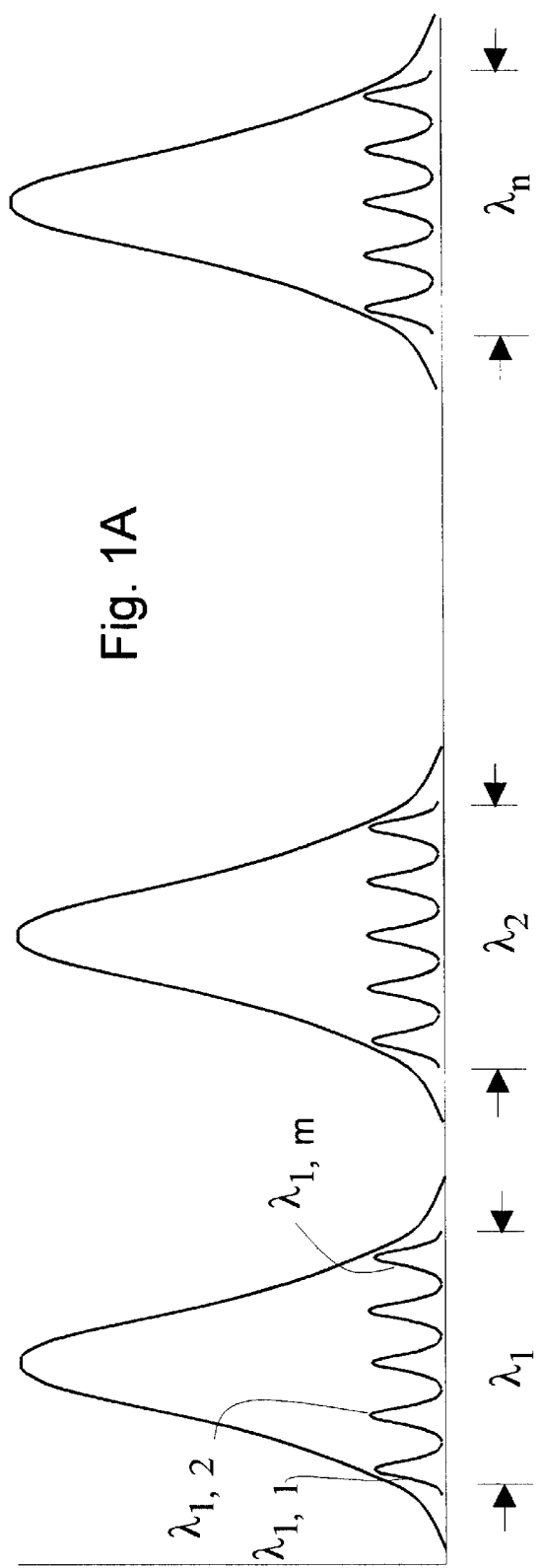
FIG. 1A is a wavelength space illustration of a broad band light beam having n sub-bands, each supporting m narrow band channels.
Figure 1B:
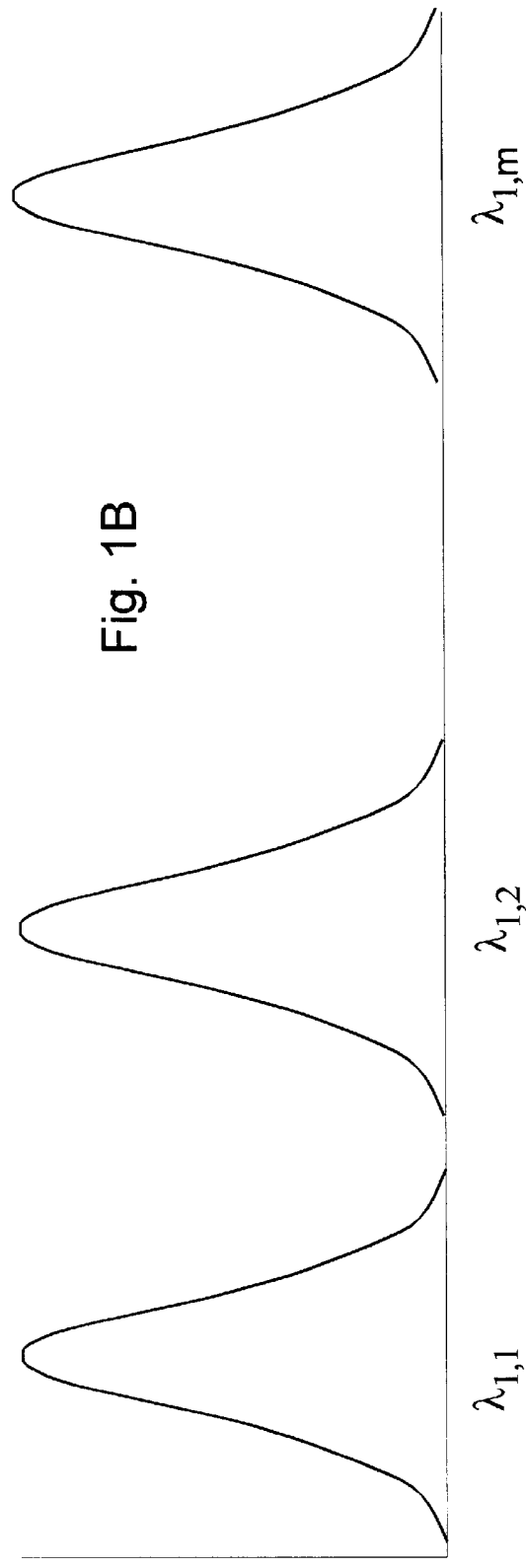
FIG. 1B (not drawn to the same scale as FIG. 1A) is a wavelength space illustration of the m narrow band channels of one of the sub-bands.

Referring now to FIG. 1A there is shown a plot of intensity versus frequency for a wideband light beam. Such a light beam, illustratively, may cover one of the above-mentioned bands such as that in the vicinity of 1.3 microns (1300 nm) and may comprise n sub-bands within that range. For example the sub-band shown at $\lambda 1$ may illustratively be centered at 1290 nm, the sub-band show at $\lambda 2$ may illustratively be centered at 1292 nm, while the sub-band $\lambda n$ may illustratively be centered at 1320 nm. Each of these sub-bands has sufficient bandwidth (and low enough noise) to support many channels for the transmission of information from a modulating transmitter (not shown). Thus, the sub-band $\lambda 1,1$ more clearly shown in FIG. 1B, includes a plurality of discrete wavelengths or channels, $\lambda 1,1$ through $\lambda 1,m$. In FIG. 1A, the amplitudes of the individual channels are shown as being uniform; however, this is merely a matter of simplifying the drawing since individual channels may be amplitude modulated or phase-modulated or some combination of both, without loss of generality.

The light beam of FIG. 1A is portrayed in FIGS. 2A and 2B as exiting a fiber at point 21 and as being applied to collimating optics 22 to produce a parallel beam along the optic axis OA. Collimating optics 22 may include a focusing mirror, if desired. The parallel beam is applied to a first interferometer 23, such as a Fizeau interferometer, whose mirror surfaces 23a, 23b, as shown in the side elevation view, FIG. 2A, are vertically inclined toward one another at a wedge angle a23. The output of interferometer 23 produces the "bar" light pattern shown in FIG. 3A. In actual fact, though not possible to be illustrated to scale in FIG. 3A, each such bar would convey the same information as a corresponding one of the waveforms of FIG. 1A. Thus, for example, the left-most bar $\lambda 1$ in FIG. 3A corresponds to the identically labeled waveform in FIG. 1A and the right-most bar $\lambda n$ in FIG. 3A corresponds to waveform $\lambda n$ of FIG. 1A. Accordingly, the free spectral range of the first interferometer 23 should be equal to or slightly greater than the composite bandwidth of the n sub-bands of FIG. 1A to avoid overlap of the fringes.

Figure 3A:
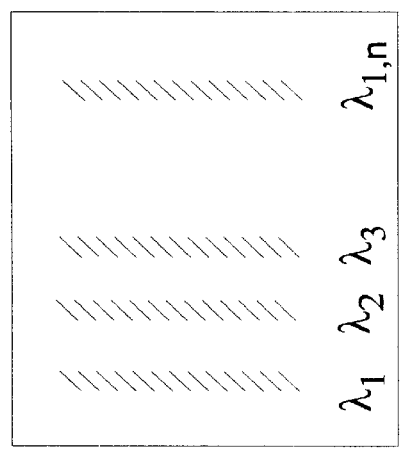
FIG. 3A is an illustration of the light pattern emerging from the first interferometer.
Figure 3B:
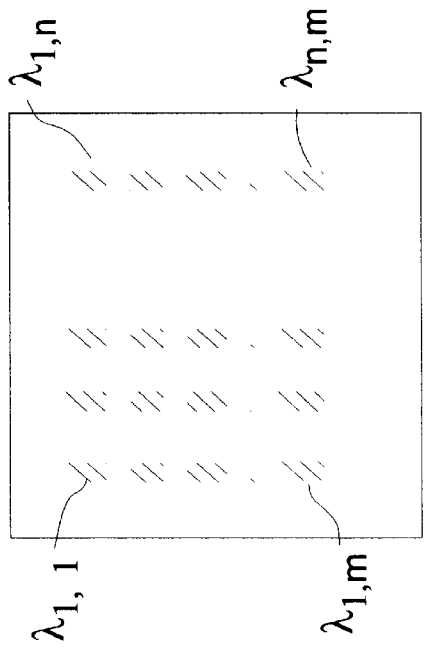
FIG. 3B is an illustration of the light pattern emerging from the second interferometer.
Figure 3C:
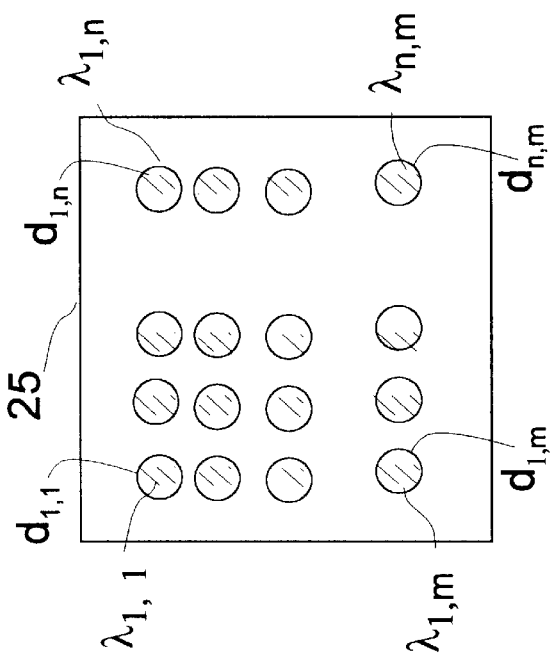
FIG. 3C is an illustration of the focal plane array of a receiver upon which the light pattern of FIG. 3B is imaged.

The bar light pattern at the output of interferometer 23, shown in FIG. 3A, is applied to the second interferometer 24, which is in line with the first interferometer and whose mirror surfaces 24a, 24b, as shown in the top (plan) view, FIG. 2B, are horizontally inclined toward one another at a wedge angle a24. In other words, the plane of the wedge angle a24 is orthogonal to the plane of the wedge angle a23. The output of interferometer 24 produces the "dot" light pattern shown in FIG. 3B wherein each "dot" corresponds to one of the channels of FIG. 1B. The free spectral range of the second interferometer 24 should be equal to or slightly greater than the bandwidth of one of the sub-bands of FIG. 1A. The dot light pattern of FIG. 3B is imaged upon the array 26 as shown in FIG. 3C. which may include either an array of photo-detector elements $d_{1,1}$ through $d_{n,m}$ or a bundle of individual fibers. Where a detector array is used each element is preferably aligned to register with one of the "dots" of pattern $\lambda_{1,1}$ through $\lambda_{n,m}$ while where a bundle of individual fibers is used each individual fiber would correspondingly be positioned to receive one of the "dots". Where a fiber bundle is used, the remote end of each (not shown) would be associated with a respective detector for an individual wavelength. Advantageously, to assist in the registration of the dot pattern on the array 26, an array of lenslets 25, schematically illustrated in FIGS. 2A and 2B, may be used to image the light pattern emerging from interferometer 24 onto the array 26. Thus, each of the transmitters (not shown) assumed to have effected the modulation of the n×m channels has been individually associated with a corresponding one of the receiving detectors $d_{1,1}$ through $d_{n,m}$.

It should be apparent that numerous modifications may be made to the illustrative embodiment. Thus, while fibers have been referred to having three low-attenuation bands available for the transmission of information of which only one band has been described in detail, the principles described herein are applicable to the use of less than an entire band as well as of more than one of the bands. In addition, although in line cascaded interferometers have been shown, it should be apparent that a roof prism or other optics may be interposed between the interferometers as desired. Further and other modifications may be made by those skilled in the art without however departing from the spirit and scope of my invention.

What is claimed is:

1. A method of optically demultiplexing a light beam carrying multiple sub-bands of discrete wavelengths, each wavelength corresponding to a channel for conveying communications information, comprising the steps of:
   a. collimating the light beam;
   b. applying the collimated light beam to a first interferometer having a free spectral range adequate to accommodate a plurality of said multiple sub-bands;
   c. applying the light beam emerging from said first interferometer to a second interferometer, said second interferometer having a free spectral range adequate to accommodate one of the wavelengths of one of said sub-bands, the plane of the wedge angle of said second interferometer being orthogonally oriented with respect to the plane of the wedge angle said first interferometer.

2. The method of claim one wherein said second interferometer is coaxially aligned with said first interferometer.

3. The method of claim 1, further comprising the step of imaging the light emerging from said second interferometer on to an array, each element of said array being aligned to intercept a corresponding one of said discrete wavelengths in the light emerging from said second interferometer.

4. The method of claim 3 wherein said elements of said array comprises photodetector elements.

5. The method of claim 4 wherein said array comprises a bundle of individual fibers.

6. Apparatus for optically demultiplexing a light beam carrying multiple sub-bands of discrete wavelengths, each wavelength corresponding to a channel for conveying communications intelligence, comprising:
   a. a light beam collimator;
   b. a first interferometer adapted to receive the light from said collimator, said first interferometer having a free spectral range adequate to accommodate a plurality of said multiple sub-bands;
   c. a second interferometer having the plane of the wedge angle of its mirrors oriented orthogonally to the plane of the wedge angle of the mirrors of said first interferometer, said second interferometer being adapted to receive the light emerging from said first interferometer and having a free spectral range adequate to accommodate one of the wavelengths of one of said sub-bands.

7. Apparatus according to claim 6 wherein said first and second interferometers are coaxially aligned.

8. A compact wavelength division demultiplexer device comprising
   a. two cascaded coaxially aligned interferometers, the planes of the wedge angle of whose mirrors are orthogonal to each other and the free spectral range of the second interferometer being a fraction of the free spectral range of the first interferometer; and
   b. a photo-detector aligned to receive the light pattern emerging from the second interferometer.

* * * * *